(12) United States Patent
Reimelt

(10) Patent No.: US 8,763,453 B2
(45) Date of Patent: Jul. 1, 2014

(54) ARRANGEMENT FOR MEASURING FILL LEVEL WITH A FILL LEVEL MEASURING DEVICE WORKING WITH MICROWAVES

(75) Inventor: Ralf Reimelt, Freiburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 264 days.

(21) Appl. No.: 13/320,852

(22) PCT Filed: Apr. 23, 2010

(86) PCT No.: PCT/EP2010/055442
§ 371 (c)(1),
(2), (4) Date: Nov. 16, 2011

(87) PCT Pub. No.: WO2010/136276
PCT Pub. Date: Dec. 2, 2010

(65) Prior Publication Data
US 2012/0060600 A1    Mar. 15, 2012

(30) Foreign Application Priority Data
May 25, 2009   (DE) .................. 10 2009 026 433

(51) Int. Cl.
*G01F 23/00*     (2006.01)
*H01P 1/08*      (2006.01)

(52) U.S. Cl.
USPC ........................................ 73/290 V; 333/252

(58) Field of Classification Search
USPC ............... 73/290 R, 290 V, 601; 333/252
See application file for complete search history.

(56) References Cited

U.S. PATENT DOCUMENTS

| | | | |
|---|---|---|---|
| 3,339,102 A | 8/1967 | Johnson | |
| 3,780,374 A | 12/1973 | Shibano et al. | |
| 3,860,891 A * | 1/1975 | Hiramatsu | 333/21 R |

(Continued)

FOREIGN PATENT DOCUMENTS

| | | |
|---|---|---|
| DE | 1948156 | 3/1971 |
| DE | 2017042 A1 | 10/1971 |

(Continued)

OTHER PUBLICATIONS

German Search Report in corresponding German Application No. 10 2009 026 433.7.

(Continued)

*Primary Examiner* — Daniel S Larkin
*Assistant Examiner* — Jamar Ray
(74) *Attorney, Agent, or Firm* — Bacon & Thomas, PLLC

(57) ABSTRACT

An arrangement for measuring fill level of a fill substance in a container, comprising: a fill level measuring device, wherein the device includes measuring device electronics and an antenna connected to the measuring device electronics; and at least one feedthrough installed in a signal path of the microwave signals or the reflection signals; the feedthrough. The feedthrough comprises a hollow conductor, into which a microwave transparent window is inserted gas tightly. The window comprises: a disk, whose thickness corresponds approximately to a half wavelength or a small integer multiple of the half wavelength of a first, hollow conductor propagation capable, signal mode of the microwave signals at a predetermined signal frequency in the disk; and two matching layers located on oppositely lying, outer surfaces of the disk. The thickness of each matching layer corresponds approximately to a fourth of the wavelength of the first, hollow conductor propagation capable, signal mode of the microwave signals at the predetermined signal frequency in the matching layers.

14 Claims, 6 Drawing Sheets

(56) References Cited

U.S. PATENT DOCUMENTS

| | | | |
|---|---|---|---|
| 4,688,009 A | 8/1987 | Ferguson et al. | |
| 5,262,743 A | 11/1993 | Jean | |
| 5,488,336 A | 1/1996 | Rivera et al. | |
| 5,703,289 A * | 12/1997 | Mulrooney | 73/290 V |
| 2006/0158371 A1 | 7/2006 | Duivenvoorden | |
| 2010/0141505 A1 | 6/2010 | Bergmann et al. | |

FOREIGN PATENT DOCUMENTS

| | | |
|---|---|---|
| DE | 2165011 | 7/1972 |
| DE | 2211438 | 9/1972 |
| DE | 19615854 C1 | 11/1997 |
| DE | 102005036715 A1 | 2/2007 |
| DE | 102006062223 A1 | 6/2008 |
| EP | 0248958 A1 | 12/1987 |
| GB | 2098006 A | 11/1982 |
| WO | 97/04495 A1 | 2/1997 |

OTHER PUBLICATIONS

International Preliminary Examination Report dated Dec. 29, 2011.
International Search Report in corresponding International Application PCT/EP2010/055442 dated Jul. 12, 2010.

* cited by examiner

ARRANGEMENT FOR MEASURING FILL LEVEL WITH A FILL LEVEL MEASURING DEVICE WORKING WITH MICROWAVES

TECHNICAL FIELD

The invention relates to an arrangement for measuring fill level of a fill substance in a container with a fill level measuring device using the travel time principle.

BACKGROUND DISCUSSION

In measurement operation, the fill level measuring device sends microwaves by means of an antenna and receives reflection signals reflected back by the surface of the fill substance after a travel time dependent on the fill level to be measured, and determines the fill level based on the travel time. Such contactless measuring arrangements are applied in a great number of sectors of industry, e.g. in the processing, chemical and food industries. In such case, the fill level measuring device is mounted on the container above the fill substance and its antenna oriented toward the fill substance.

All known methods, which enable relatively short distances to be measured by means of reflected microwaves, can be applied to determine the travel times. The best known examples are pulse radar and frequency modulated, continuous wave radar (FMCW radar).

In the case of pulse radar, short microwave transmission pulses are periodically sent, which reflect off the surface of the fill substance and are received back after a travel time dependent on distance. An echo function is derived based on the received signal; the echo function shows received signal amplitude as a function of time. Each value of this echo function corresponds to the amplitude of an echo reflected at a determined distance from the antenna.

In the FMCW method, a microwave signal, which is periodically frequency modulated linearly, for example, according to a saw tooth function, is sent continuously. Consequently, the frequency of the echo signal received has a frequency difference compared to the instantaneous frequency that the transmission signal has at the point in time of the reception; the frequency difference depends on the travel time of the microwave signal and its echo signal. The frequency difference between transmission signal and the received signal, which can be gained by mixing both signals and evaluating the Fourier spectrum of the mixed signal, thus corresponds to the distance of the reflecting area from the antenna. Additionally, the amplitudes of the spectral lines of the frequency spectrum gained through a Fourier transformation correspond to the echo amplitudes. Consequently, this Fourier spectrum represents the echo function in this case.

From the echo function, at least one wanted echo is determined, which corresponds to the reflection of the transmission signal off the surface of the fill substance. With a known propagation velocity of the microwaves, the distance, through which the microwaves travel on their way from the measuring device to the surface of the fill substance and back, is directly determinable from the travel time of the wanted echo. On the basis of the installed height of the fill level measuring device over the container, the fill level sought can be directly calculated.

There are a large number of applications, in which it is required or at least desirable, to transmit the microwave signals through a gas tight feedthrough into the container and to receive its reflection signals through such feedthrough. This is always the case e.g. when a gas tight separation is required for the process; the container is sealed gas tightly. Furthermore, such a feedthrough, which prevents gas diffusion is required e.g. when an encapsulation of the measuring device electronics is prescribed, e.g., for explosion protection reasons. This requirement is especially relevant for fill level measuring devices using high frequency microwave signals, especially microwave signals with frequencies of 70 GHz or higher, for fill level measurement, since very high power levels are converted in these measuring devices in the measuring device electronics.

Gas tight feedthroughs can be realized, e.g., in the form of hollow conductor feedthroughs. In such case, a window comprising a microwave permeable insulator is inserted into a hollow conductor. Conventional methods for this are soldering in ceramic windows or glazing in glass windows. Glazings involve, most often, compression type glass feedthroughs or as so called fitted feedthroughs. In such case, the hollow conductor, a metal hollow conductor as a rule, is shrink fit onto a glass window with similar coefficient of thermal expansion. In this way, the sealing of the feedthrough is assured.

DE 41 00 922 A1 describes a hollow conductor feedthrough, which can be applied in applications, in which the feedthrough is exposed to high pressure and/or temperature fluctuations. The feedthrough comprises a hollow conductor in which two windows comprising a material permeable by electromagnetic waves are arranged as mirror images relative to one another; the hollow conductor is divided into two separate segments by the windows. Each window has a cylindrical section and a conical section adjoining thereto. The conical sections are each embedded in a correspondingly conically formed socket in the hollow conductor in order to achieve a high resistance of the feedthrough against pressure and/or temperature fluctuations. As evident from the figures of this application, a very thick solid window arises thereby. Arranged on the free ends of the cylindrical sections are $\lambda/4$ transformers.

However, the windows of such feedthroughs lead, as a rule, to a strong degradation of the quality of the measuring signals. In relation to this it has been shown that these disadvantageous effects of the feedthrough become more serious as the thickness of the window increases in comparison to the wavelength of the microwave signals. Reflections and multiple reflections, which occur at the transitions to and from the window and in the window, are the main cause for these disadvantageous effects. In this way disturbance signals arise, which are superimposed on the actual measurement signal and therewith lead to a degradation of the quality of the measuring signals.

SUMMARY OF THE INVENTION

It is an object of the invention to provide an arrangement for measuring fill level of a fill substance in a container with a fill level measuring device that works with microwaves, wherein the arrangement is equipped with a hollow conductor feedthrough, which, especially with high signal frequencies of 70 GHz and greater, effects a smallest possible degradation of the measurement signal quality over a largest possible bandwidth of signal frequencies.

For this, the invention resides in an arrangement for measuring fill level of a fill substance in a container, comprising:
  a fill level measuring device that works with microwaves, wherein the device includes
    a measuring device electronics having a microwave generator for producing microwave signals, and
    an antenna connected to the measuring device electronics and serving to transmit microwave signals into the container toward the fill substance and an antenna serving to receive reflection signals of the microwave signals reflected in the container back in the direction of the antenna; and at least one feedthrough installed in the signal path of the microwave signals or the reflection signals, wherein the feedthrough includes a hollow conductor, and a microwave transparent window installed gas tightly in the hollow conductor, wherein the window includes a disk, whose thickness corresponds approximately to a half wavelength or a small integer multiple of the half wavelength of a first, hollow conductor propagation capable, signal mode, especially a fundamental mode, of the microwave signals at a predetermined signal frequency in the disk, and, located on oppositely lying, outer surfaces of the disk, two matching layers, whose thickness corresponds approximately to a fourth of the wavelength of the first, hollow conductor propagation capable, signal mode of the microwave signals at the predetermined signal frequency in the matching layers.

In an embodiment of the invention, the fill level measuring device is a pulse radar device, the microwave signals are microwave pulses of a predetermined transmission frequency and the predetermined signal frequency is equal to this transmission frequency.

In another embodiment of the invention, the fill level measuring device is an FMCW radar device, the microwave signals are frequency modulated periodically, and the predetermined signal frequency is equal to a mean frequency of the frequency modulated signals.

In a preferred embodiment, each matching layer has a dielectric constant, which corresponds to a square root of a product of a dielectric constant of the hollow conductor and a dielectric constant of the disk.

In a further development of the invention the window is a one piece component comprising a single material; and the matching layers are cavity bearing layers of this material provided on both external sides of the disk.

In an embodiment of the further development, the cavities are straight grooves extending in the matching layers or circular grooves extending in the matching layers.

In an embodiment of the further development, the cavities have a depth, which is equal to the thickness of the matching layers, and which corresponds approximately to the fourth of the wavelength of the first, hollow conductor propagation capable, signal mode of the microwave signals at the predetermined signal frequency in the matching layers.

In an additional embodiment of the further development, each matching layer has an effective dielectric constant, which is dependent on the dimensions of the cavities; the effective dielectric constant corresponds to the root of the product of the dielectric constant of the hollow conductor and the dielectric constant of the disk.

In an additional embodiment of the further development, a ratio of a total volume occupied by all cavities of an matching layer to the total volume of the matching layer is predetermined in such a manner that the matching layer has an effective dielectric constant, which corresponds to the root of the product of the dielectric constant of the hollow conductor and the dielectric constant of the disk.

Additionally, the invention comprises an arrangement of the invention, in which the feedthrough and the window have a rectangular cross section;

the antenna has a circular cross section; and a transition element is applied between the feedthrough and the antenna; the transition element transitions the rectangular cross section into the round cross section.

Additionally, the invention comprises a further development of the latter arrangement, in which the diameter of the circular cross section is slightly greater than the longer side of the rectangular cross section, so that the rectangular cross section completely fits in the circular cross section the transition element has a number of zones adjoining one another, of which a first outer zone has an axial, traversing bore, whose cross section is equal to the circular cross section of the antenna;

of which a second outer zone has an axial traversing bore, whose cross section is equal to the rectangular cross section of the feedthrough; and of which at least two transition zones are arranged between the first and the second outer zone, each transition zone has a cavity penetrating the transition zone in an axial direction, the cavity comprises a bore with a rectangular cross section and a coaxial supplemental bore with a circular cross section; wherein the diameters of the supplemental bores are smaller than the diameter of the circular cross section of the first outer zone and greater than the shorter side of the rectangular cross section of the second outer zone, and, proceeding from the transition zone neighboring the first zone, decrease from transition zone to transition zone.

Furthermore, the invention comprises a feedthrough for microwave signals, comprising:

A hollow conductor; and a microwave transparent window installed gas tightly in the hollow conductor, wherein the window includes a disk, whose thickness corresponds approximately to a half wavelength or a small integer multiple of the half wavelength of the first, hollow conductor propagation capable, signal mode of the microwave signals at a predetermined signal frequency in the disk; and located on oppositely lying, outer surfaces of the disk, two matching layers, whose thickness corresponds approximately to a fourth of the wavelength of the first, hollow conductor propagation capable, signal mode of the microwave signals at the predetermined signal frequency.

In a further development of the feedthrough, the window is a one piece component comprising a single material; and the matching layers are layers of such material provided on the two oppositely lying, outer surfaces of the disk and equipped with cavities.

BRIEF DESCRIPTION OF THE DRAWINGS

The invention and its advantages will now be explained in greater detail based on the figures of the drawing, in which three examples of embodiments are presented; equal parts are provided with equal reference characters in the figures, which show as follows.

FIG. 4b is a plan view of the window of FIG. 4a;

DETAILED DISCUSSION IN CONJUNCTION WITH THE DRAWINGS

Figure 1:
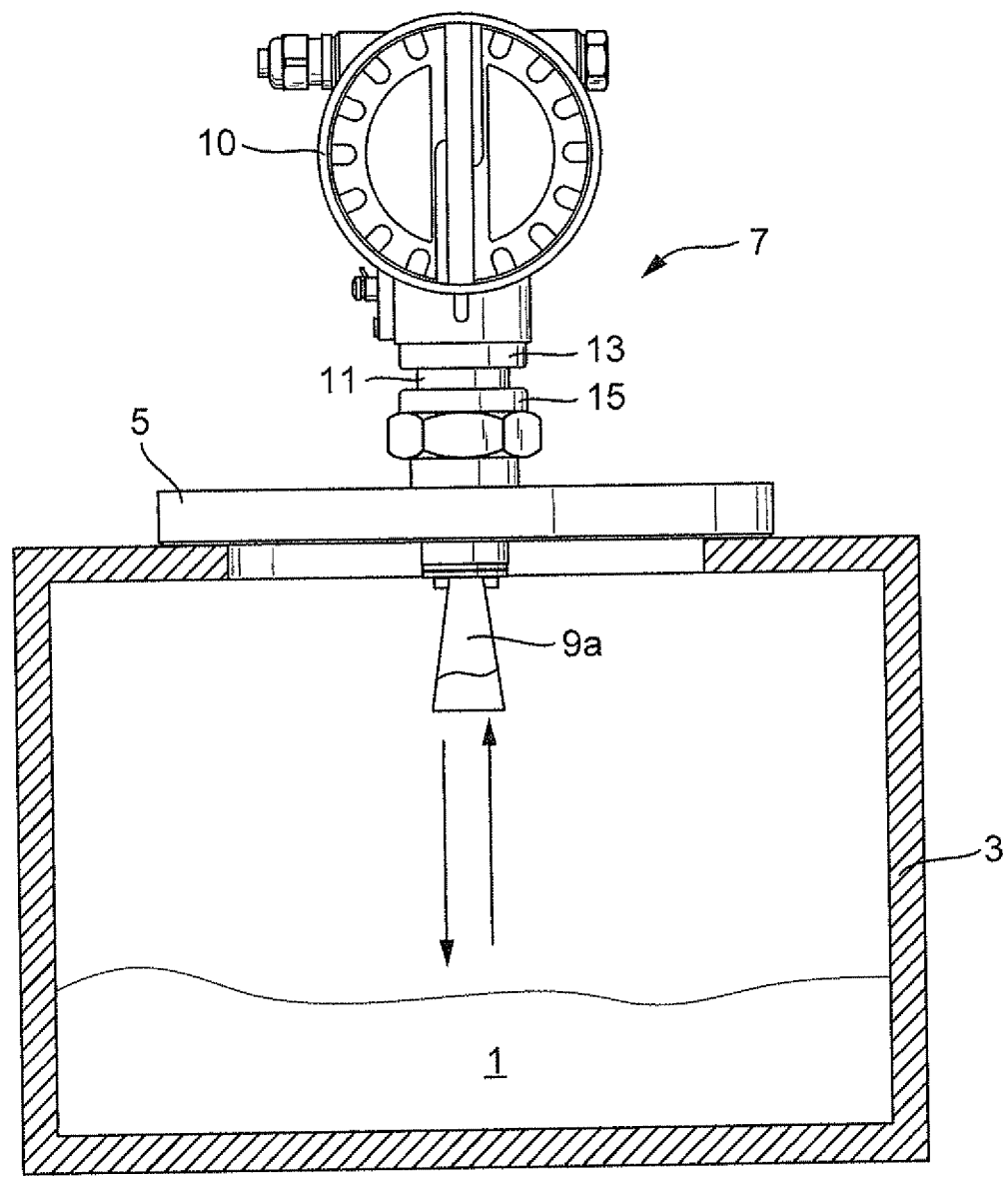
FIG. 1 is an arrangement for measuring fill level.
Figure 2:
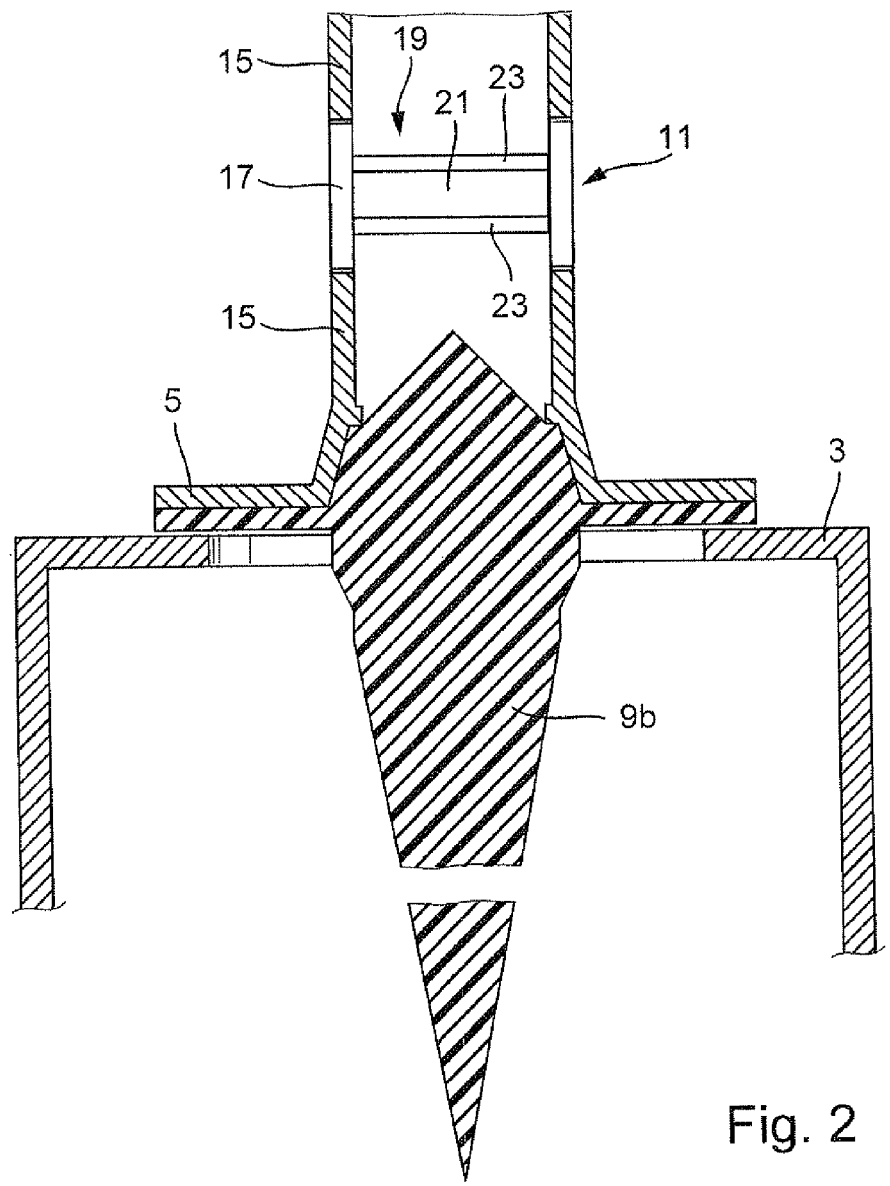
FIG. 2 is a dielectric rod antenna fed by a hollow conductor provided with a feedthrough.

FIG. 1 shows an arrangement of the invention for measuring fill level of a fill substance 1 in a container 3. The arrangement comprises fill level measuring device 7, which operates on the travel time principle using microwaves. Measuring device 7 is secured to the container 3, e.g. by means of a flange 5. For example, the pulse or FMCW radar fill level measuring devices mentioned above are suitable to serve as fill level measuring device 7. Fill level measuring device 7 includes a measuring device electronics, which has a microwave generator for producing microwave signals, and an antenna 9 connected to the measuring device electronics. In the example of an embodiment illustrated, the antenna 9 is a horn antenna 9a introduced into the container 3. The invention is, however, not limited to horn antennas 9a, as is described below. Thus, FIG. 2 shows an alternative example of an embodiment, in which the antenna 9 is a dielectric rod antenna 9b. The measuring device electronics is arranged in a housing 10 located outside the container 3. Measuring device electronics and their microwave generators are known from the state of the art, and, consequently, not shown or diskussed in detail here.

Antenna 9 serves to transmit the microwave signals toward the fill substance 1 in the container 3 and to receive their reflection signals reflected in the container 3 back in the direction of the antenna 9. This is symbolically represented by the arrows in FIG. 1. The reflection signals are fed to the measuring device electronics, which ascertains the fill level dependent, signal travel time required for the path from the fill level measuring device 7 to the surface of the fill substance and back based on these signals and determines fill level based on this signal travel time. Alternatively, two separate antennas can also be used for this, one of which serves to transmit the microwave signals toward the fill substance 1 in the container 3, and a second serves to receive the reflection signals of the transmitted microwave signals reflected off the surface of the fill substance and to send the reflection signals to the measuring device electronics.

According to the invention, the arrangement has at least one gas tight, microwave transparent, feedthrough 11 inserted into the signal path of the microwave transmission signals or the reflection signals.

Feedthrough 11, depending on application, can be inserted at different locations into the signal path. In the example of an embodiment illustrated in FIG. 1, the feedthrough is applied directly in a hollow conductor output 13 of the measuring device electronics; the antenna 9 is fed via the hollow conductor output 13 and the reflection signals received by the antenna 9 are fed to the measuring device electronics via the hollow conductor output 13. This hollow conductor output 13 is connected to an additional hollow conductor 15, which, in turn, is connected to the antenna 9a. In the illustrated example of an embodiment, the feedthrough 11 is positioned directly at the output of the housing 10 for better visualization. The feedthrough 11 can naturally also be arranged within the housing 10. Feedthrough 11 effects here an encapsulation of the measuring device electronics, as required, for example, in the case of applications in explosion endangered areas. This arrangement is especially advantageous e.g. in connection with fill level measuring devices 7 using high frequency microwave signals, especially microwave signals with frequencies of 70 GHz or higher, since very high powers not compatible with explosion protection guidelines are converted in the measuring device electronics in these fill level measuring devices 7.

Alternatively, however, the feedthrough 11 can also be applied with the purpose of effecting a gas tight partitioning from the process. In this case, the feedthrough is preferably arranged in the immediate vicinity of the container 3. This happens, as shown in FIG. 2 for example, in the application of the feedthrough 11 in the hollow conductor 15 in the immediate vicinity of the antenna 9b; the antenna 9b is fed microwave signals from the measuring device electronics via the hollow conductor 15, and the reflection signals received by the antenna 9b are fed to the measuring device electronics via the hollow conductor 15. In the case of application of two separate antennas for sending and, respectively, receiving mentioned above, preferably two feedthroughs are applied, with each feedthrough being arranged in the immediate vicinity of one of the antennas.

Figure 3:
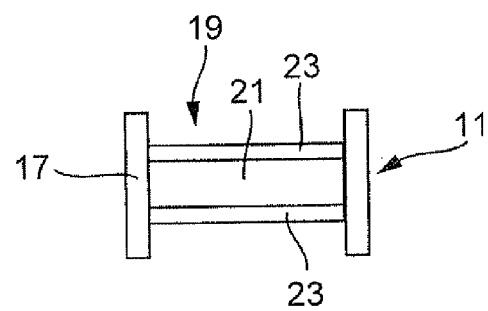
FIG. 3 is a feedthrough.

Feedthrough 11 comprises a hollow conductor 17 and a microwave transparent window 19 inserted gas tightly into the hollow conductor 17. FIG. 3 shows a detailed first example of an embodiment of this. Window 19 includes a planar disk of, for example, ceramic, glass, e.g. a borosilicate glass, or some other microwave transparent material. Disk 21 is inserted gas tightly into the hollow conductor 17. This happens, for example, by soldering-in a ceramic disk, or by glazing-in a glass disk.

According to the invention, disk 21 has a thickness, which corresponds approximately to a half wavelength $\lambda/2$ or a small integer multiple x of the half wavelength $\lambda/2$ of a first, hollow conductor 17 propagation capable, signal mode, especially a fundamental mode, of the microwave signals at a predetermined signal frequency in the disk 21. In this way an extremely low reflection transition is effected, since reflected signal fractions striking the disk 21 on its upper side ideally destructively superimpose on the reflected signal fractions striking the underside of the disk, and therewith no longer have negative effects on the quality of the measurement signal.

The wavelength $\lambda$ results from the dielectric constant of the material of the disk 21, the first mode, which is capable of propagation in the hollow conductor 17, and the signal frequency and can be determined, for example, using simulation calculations. The above condition for a destructive interference is exactly met, strictly speaking, only for the predetermined signal frequency. The condition is also approximately met, however, for frequencies closely adjoining this frequency, so that a certain bandwidth results from the above specification, in which bandwidth there is a low reflection transition.

Typically, the microwave signals have not just a single frequency f, but a frequency spectrum. Thus, for example, a pulse radar device using a transmission frequency of 77 GHz has a frequency bandwidth of 72 GHz-82 GHz. Consequently, the transmission frequency of 77 GHz is preferably used as the predetermined signal frequency for dimensioning the thickness of the disk 21. Analogously, for FMCW radar devices, a mean frequency of the frequency spectrum sent is used as a predetermined signal frequency for dimensioning. The desired conditions for destructive interference are therewith optimally met for the transmission, or center, frequency, while the conditions are met with less rigor, the more the frequencies deviate from this transmission, or center, frequency.

In order to achieve a transition with as low a reflection as possible for a bandwidth of frequencies as large as possible, the thickness of the disk 21 preferably corresponds approximately to the half wavelength $\lambda/2$. However, the disk 21 can also have a thickness that is a small multiple (e.g. two or three times) of the half wavelength $\lambda/2$. This is helpful e.g. when a high mechanical stability and durability of the feedthrough 11 is required. In each such case, however, the smallest acceptable multiple of the half wavelength $\lambda/2$ should be used. The reason for this is that the bandwidth of frequencies, for which the transition has a low reflection, decreases with the increasing thickness of the disk 21, i.e. with increasing multiples x of the half wavelength $\lambda/2$.

This means that the optimal thickness of the disk 21 decreases with rising frequency. The thinner the disk 21 is, the more manufacturing related tolerances of the thickness of the disk 21 and tolerances for the dielectric constant of the material of the disk 21 become relevant. This especially affects bandwidth disadvantageously in the case of high frequencies.

To increase the bandwidth, over which the transition through the feedthrough 11 is as low reflection as possible, a matching layer 23 is provided on the two oppositely lying, outer surfaces of the disk 21; each matching layer 23 has a thickness corresponding approximately to a fourth of the wavelength $\lambda/4$ of the first, hollow conductor 17 propagation capable, signal mode of the microwave signals at the predetermined signal frequency in the matching layer 23.

The wavelength $\lambda$ here also results from the dielectric constant of the matching layer 23, the first, propagation-capable mode and the predetermined signal frequency and can likewise be determined using simulation calculations. For dimensioning the thickness of the matching layer 23, the transmission frequency, or the center frequency, of the frequency spectrum transmitted is preferably used here also as the predetermined signal frequency.

Each matching layer 23 preferably has a dielectric constant equaling a square root of the product of the dielectric constant of the hollow conductor 13 or 15 and the dielectric constant of the disk 21.

Fundamentally, as shown in FIG. 3, an option is to construct the matching layers 23 as separate layers, which are appropriately secured, e.g. adhered, to the two oppositely lying, outer surfaces of the disk 21. It is, however, not always possible to find a material, which has the exact dielectric constant desired for this. Moreover, depending on the position of the feedthrough 11, there can also be certain requirements regarding chemical resistance of the material and the mechanical durability of the securement of the matching layers 23 onto the disk 21; these can still further limit the number of usable materials.

These problems arising in given cases can be overcome by the further developments of the invention illustrated in FIGS. 4a and 4b and 5a and 5b.

Figure 4A:
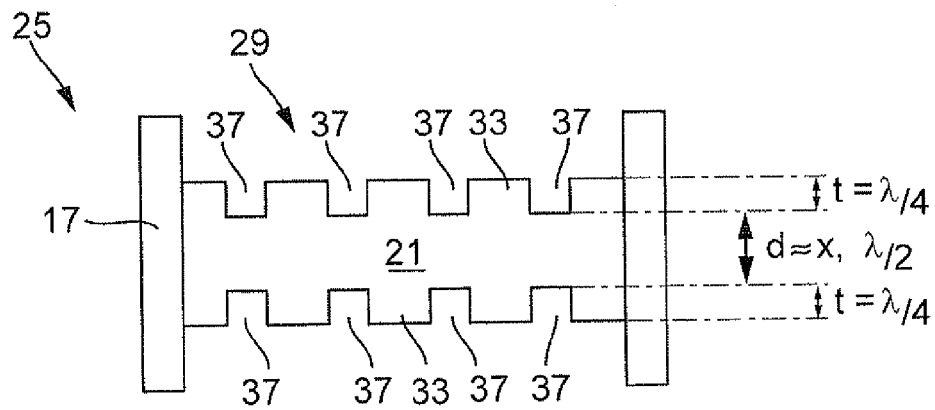
FIG. 4a is a feedthrough with matching layers, which are formed by additional window layers equipped with straight grooves.

The feedthroughs 25, 27 illustrated in these figures each likewise have a window 29, 31 inserted into the hollow conductor 17. Also here, window 29, 31 comprises the disk 21 and two matching layers 33, 35. FIGS. 4a and 5a show, respectively, sectional drawings of the feedthroughs 25 and 27 and FIGS. 4b and 5b, respectively, plan views of the windows 29 and 31 of the feedthroughs 25 and 27, respectively.

In contrast to the variant of the feedthrough 11 illustrated in FIG. 2, the windows 29, 31 here are, however, one piece components of a single material. I.e. the disk 21 and the two matching layers 33, 35 are formed by a single component made of a single material. The component is e.g. ceramic or glass, especially a borosilicate glass, and is applied gas tightly, e.g. soldered in or glazed in, in the hollow conductor 17.

The disk 21 also here has a thickness d, which corresponds approximately to half the wavelength $\lambda/2$ or a small integer multiple x of half the wavelength $\lambda/2$ of the first, hollow conductor propagation capable, signal mode of the microwave signals at the predetermined signal frequency in the disk 21. The matching layers 33, 35 are layers of the respective window 29, 31 provided on the two oppositely lying, outer surfaces of the disk 21 and equipped with cavities 37, 39. This offers the advantages that the matching layers 33, 35 are integral components of the window 29, 31, that they do not need to be applied in a separate working step, and that they also are not shed from the disk 21 in the case of a strong chemical or mechanical load or in the case of temperature and/or pressure fluctuations acting on the window 29, 31.

Figure 4B:
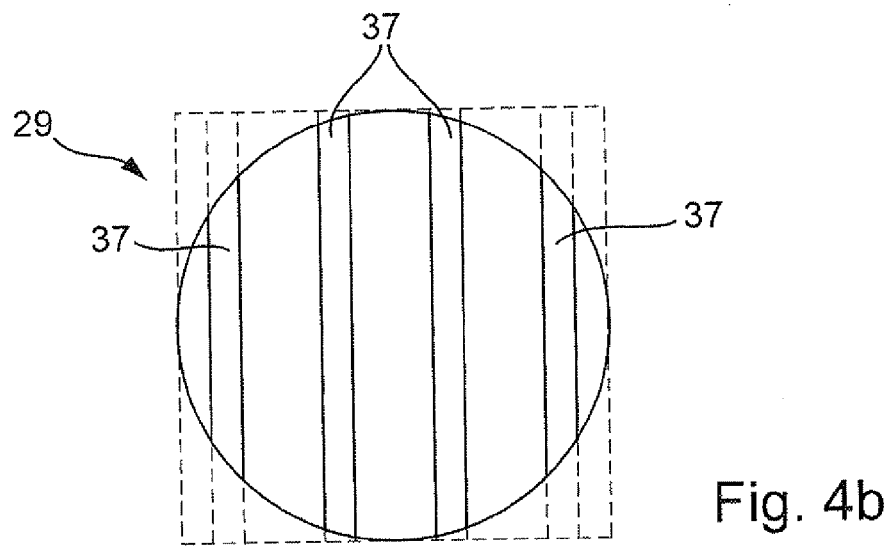
Figure 5A:
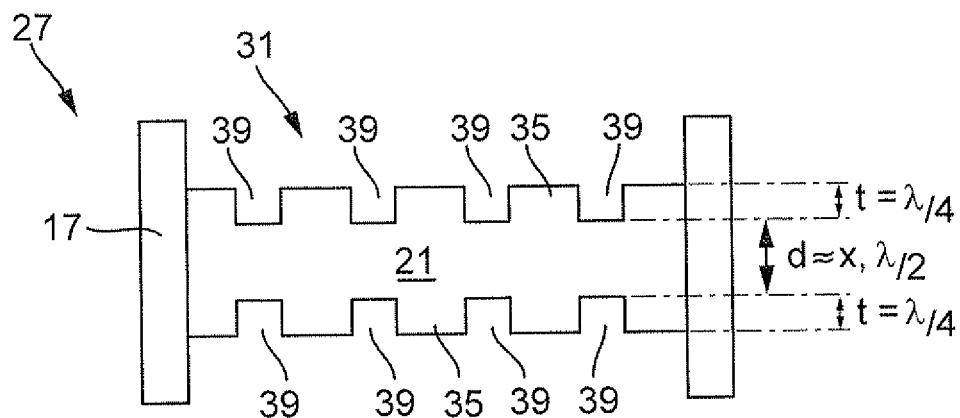
FIG. 5a is a feedthrough with matching layers, which are formed by additional window layers equipped with circular grooves.
Figure 5B:
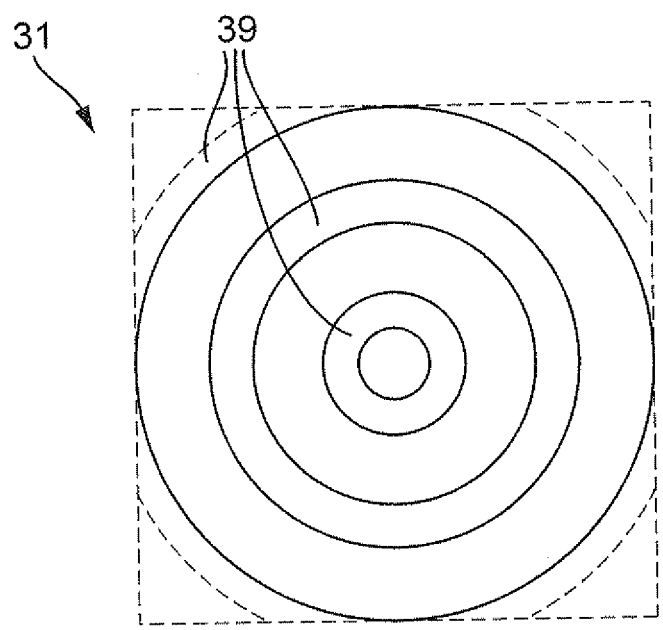
FIG. 5b is a plan view of the window of FIG. 5b.

In the example of an embodiment illustrated in FIGS. 4a and 4b, the cavities 37 are straight grooves extending in the matching layer 33, while in the example of an embodiment illustrated in FIGS. 5a and 5b, the cavities 39 are circularly extending grooves in the matching layer 35. Alternatively, cavities with other profiles can naturally also be used.

The cavities 37, 39 cause the matching layers 33, 35 to have effective dielectric constants, which are dependent on the dimensions of the cavities 37, 39, and which are smaller than that of the disk 21. The effective dielectric constant is, thus, selectable within wide limits based on the dimensioning of the cavities 37, 39. In order to achieve a matching as optimal and as broadbanded as possible, the dimensions of the cavities 37, 39 are preferably selected in such a manner that the matching layers 33, 35 each have an effective dielectric constant dependent on these dimensions, such that the effective dielectric constant corresponds to the square root of the product of the dielectric constant of the hollow conductor 17 and the dielectric constant of the disk 21. The exact dimensioning can be ascertained using computer simulations, for example.

The optimal dimensioning can be ascertained, for example, based on a variation of the ratio of a total volume of all cavities of a matching layer to the total volume of the respective matching layer 33, 35. The ratio is then correspondingly predetermined in such a manner that the matching layer 33, 35 has an effective dielectric constant, which corresponds to the square root of the product of the dielectric constant of the hollow conductor 17 and the dielectric constant of the disk 21.

The cavities 37, 39 preferably have a depth t, which is equal to the thickness of the matching layers 33, 35, and corresponds, in the case of the predetermined signal frequency, to a fourth of the wavelength, i.e. $\lambda/4$, of the first, hollow conductor propagation capable, signal mode of the microwave signals 17 in the matching layers 29, 31.

The feedthroughs 11, 25, 27 of the invention can be embodied both as a round hollow conductor feedthrough as well as also a rectangular hollow conductor feedthrough, depending on application. In the case of a round hollow conductor feedthrough, the hollow conductor 17 and the window 19, 29, applied therein each have a circular cross section. In the case of a rectangular hollow conductor feedthrough, the hollow conductor 17 and the window 19, 29, 31 applied therein correspondingly have a rectangular cross section. In FIGS. 4b and 5b, a round hollow conductor feedthrough is represented by the solid line in each figure and the corresponding rectangular hollow conductor feedthrough is represented by the dashed line in each figure for purposes of illustration. The first mode capable of propagation in a round hollow conductor is the TE11 mode. The first mode capable of propagation in the rectangular hollow conductor is the TE10 mode. The round hollow conductor feedthroughs are used in conjunction with antennas or antenna feeds with circular cross sections; the rectangular hollow conductor feedthroughs are used in conjunction with antennas or antenna feeds with circular cross sections.

In fill level measuring technology today, as a rule, antennas with circular cross sections, such as e.g. the illustrated horn antenna 9a and the illustrated dielectric rod radiator 9b, are used predominantly for manufacturing reasons.

There are, however, applications in which it is desired to feed antennas with round cross section as far as possible via a rectangular hollow conductor. The reason for this is that antennas with a round cross section offer manufacturing advantages and that the supply via a rectangular hollow conductor offers advantages in these applications.

A example for this are applications in which only a single microwave mode, typically the first mode capable of propagation, is to be sent and received. The frequency range, in which exclusively the first propagation capable mode, not, however, the next higher mode, is capable of propagation, is clearly greater in rectangular hollow conductors than in round hollow conductors. The cause of this is that the distance between the cut-off frequency of the first propagation capable mode and the cut-off frequency of the next higher mode is greater in a rectangular hollow conductor than in a round hollow conductor.

Figure 6:
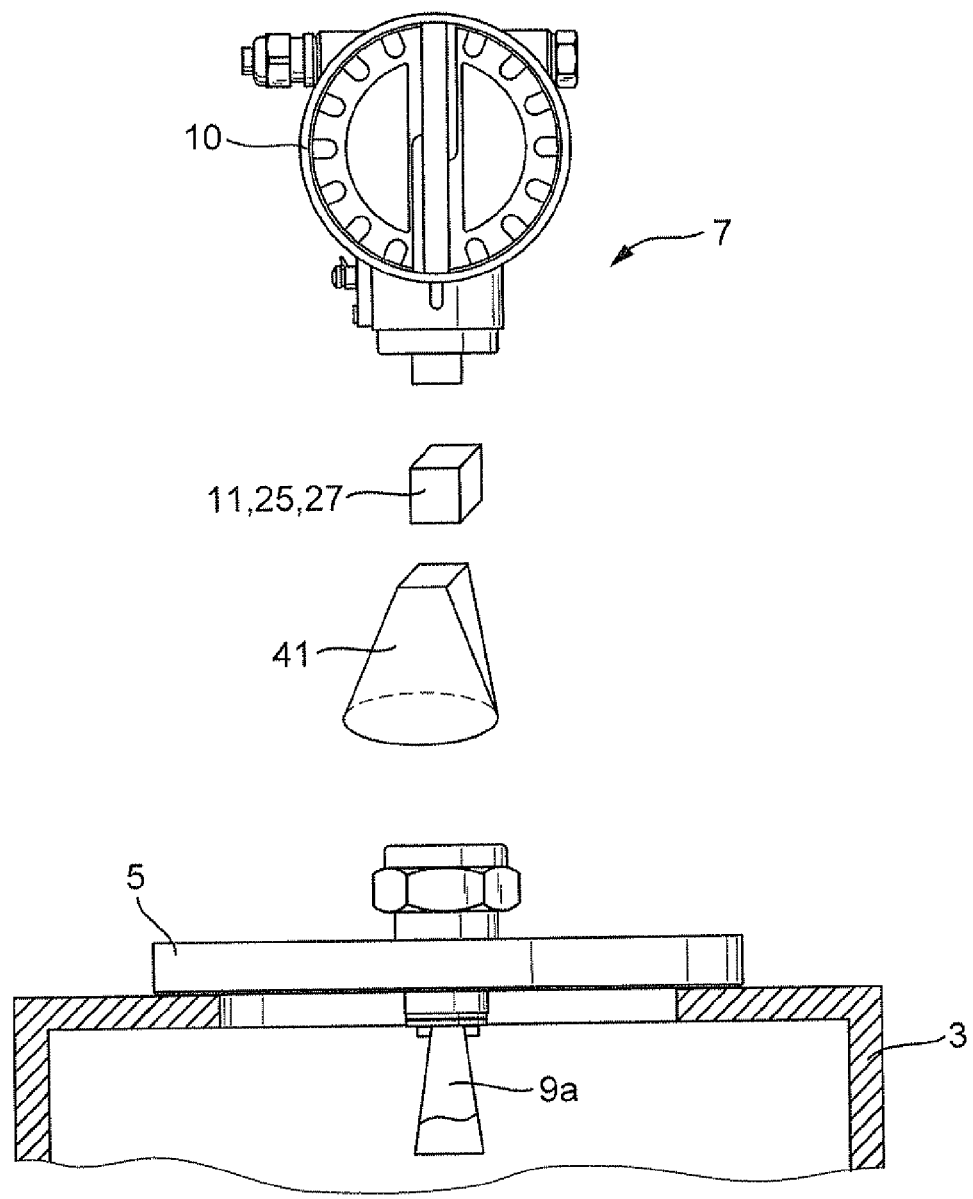
FIG. 6 is an arrangement of the invention with a feedthrough with a rectangular cross section, an antenna with a round cross section, and a transition element installed between the feedthrough and the antenna.

In such cases, as shown in FIG. 6, a feedthrough of the invention, e.g. the feedthrough 11, 25 or 27 with a window 19, 29, 31 with a rectangular cross section, is preferably applied in combination with an antenna with a circular disk shaped cross section, e.g. the horn antenna 9a. In order to enable this, a transition element 41 is inserted between the feedthrough 11, 25, or 27 and the antenna 9a. The transition element 41 is a hollow conductor, which has a rectangular cross section on the feedthrough side and a round cross section on the antenna side. The transition element 41 is formed in such a manner that, in its interior, the feedthrough side, rectangular cross section is transformed to the antenna side, circular cross section as continuously as possible as one proceeds through the transition element 41.

Figure 7:
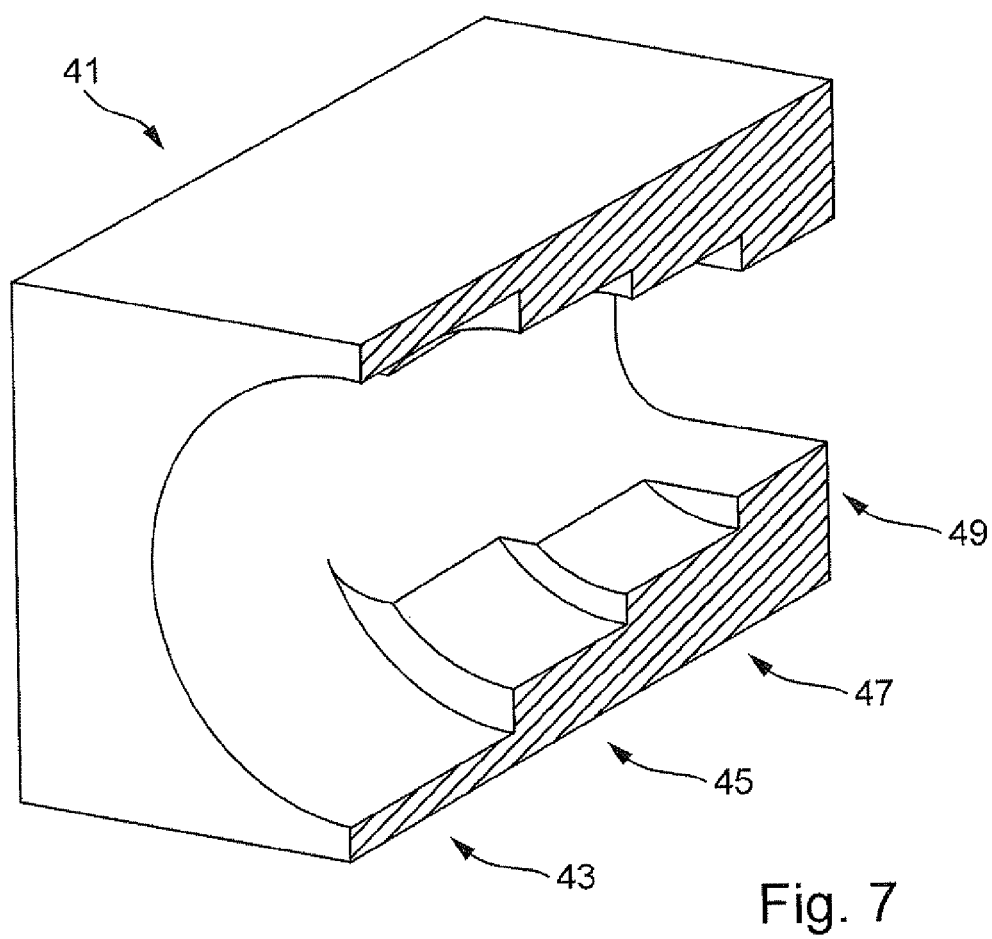
FIG. 7 is a view of half of the transition element of FIG. 6.

FIG. 7 shows a view of a half of an embodiment of such a transition element 41, especially in a form advantageous for manufacturing reasons. The transition element 41 is manufactured from a full block and comprises a plurality of zones adjoining one another. A first outer zone 43 facing the observer in the drawing has an axial, traversing bore, whose cross section equals the circular cross section of the antenna 9a. A second outer zone 49 facing away from the observer in the drawing has an axial, traversing bore, whose cross section equals the rectangular cross section of the feedthrough. Preferably, a rectangular cross section with rounded off corners is used. The diameter of the circular cross section is slightly greater than the longer side of the rectangular cross section, so that the rectangular cross section completely fits within the circular cross section.

At least two transition zones 45, 47 are arranged between the first and the second outer zones 43, 49; each of the transition zones 45, 46 has a cavity penetrating the transition zone 45, 47 in an axial direction. The cavities comprise, in each cased, a bore with a rectangular cross section and a supplemental bore with a circular cross section coaxial to the bore with a rectangular cross section. In such case, the diameters of the supplemental bores are all smaller than the diameter of the circular cross section of the first outer zone 43 and greater than the shorter side of the rectangular cross section of the second outer zone 49. Proceeding from the transition zone 45 adjoining the first zone 43, the diameter of the supplemental bores decrease from transition zone 45 to transition zone 47.

The transition element 41 is manufactured by first drilling a bore with a rectangular cross section completely through the solid block in the axial direction. Then, the first zone 43 is manufactured by boring out the bore of rectangular cross section already existing in this section of the block to form the circular cross section of the antenna 9a. Thereafter, the transition zones 45, 47 are manufactured by successively inserting drills of circular cross section and always decreasing diameters through the zone 43 into the respective transition zones 45, 47, such that the cross sectional areas in the individual transition zones 45, 47 are enlarged by the drills.

1 fill substance
3 container
5 flange
7 fill level measuring device
9 antenna
9a horn antenna
9b dielectric rod antenna
10 housing
11 feedthrough
13 hollow conductor output
15 hollow conductor
17 hollow conductor of the feedthrough
19 window
21 disk
23 matching layer
25 feedthrough
27 feedthrough
29 window
31 window
33 matching layer
35 matching layer
37 cavities
39 cavities
41 transition element
43 first outer zone
45 transition zone
47 transition zone
49 second outer zone

The invention claimed is:

1. An arrangement for measuring the fill level of a fill substance in a container, comprising:
    a fill level measuring device that works with microwaves, wherein the device includes measuring device electronics having a microwave generator for producing microwave signals, and an antenna connected to said measuring device electronics and serving to transmit the microwave signals into the container toward the fill substance and an antenna serving to receive reflection signals of the microwave signals reflected in the container back in the direction of said antenna; and
    at least one feedthrough installed in a signal path of the microwave signals, wherein said at least one feedthrough includes a hollow conductor, and a microwave transparent window installed gas tightly in said hollow conductor, wherein said window includes:
a disk, whose thickness corresponds approximately to a half wavelength or a small integer multiple of the half wavelength of a first, hollow conductor propagation capable, signal mode, of the microwave signals at a predetermined signal frequency in said disk; and
two matching layers located on oppositely lying, outer surfaces of said disk, wherein said matching layers' thickness corresponds approximately to a fourth of the wavelength of the first, hollow conductor propagation capable, signal mode of the microwave signals at the predetermined signal frequency in the matching layers; and
said matching layers each have a dielectric constant, which corresponds to a square root of a product of a dielectric constant of said hollow conductor and a dielectric constant of said disk.

2. The arrangement as claimed in claim 1, wherein:
said fill level measuring device is a pulse radar device;
the microwave signals are microwave pulses of a predetermined transmission frequency; and
the predetermined signal frequency equals this transmission frequency.

3. The arrangement as claimed in claim 1, wherein:
said fill level measuring device is an FMCW radar device;
the microwave signals are periodically frequency modulated; and
the predetermined signal frequency equals a center frequency of the frequency modulated signals.

4. The arrangement as claimed in claim 1, wherein:
said window is a one piece component of a single material; and
said matching layers are layers of such material provided on the two oppositely lying, outer surfaces of said disk and equipped with cavities.

5. The arrangement as claimed in claim 4, wherein:
said cavities are straight grooves extending in said matching layers.

6. The arrangement as claimed in claim 4, wherein:
said cavities are circular grooves extending in said matching layers.

7. The arrangement as claimed in claim 4, wherein:
said cavities have a depth, which equals the thickness of said matching layers, and which corresponds approximately to one fourth of the wavelength of the first, hollow conductor propagation capable, signal mode of the microwave signals at the predetermined signal frequency in said matching layers.

8. The arrangement as claimed in claim 4, wherein
each of said matching layers has an effective dielectric constant dependent on the dimensions of said cavities and the effective dielectric constant corresponds to the square root of the product of the dielectric constant of said hollow conductor and the dielectric constant of said disk.

9. The arrangement as claimed in claim 4, wherein:
a ratio of a total volume of all cavities of a matching layer to the total volume of the matching layer is predetermined in such a manner that the matching layer has an effective dielectric constant, which corresponds to the square root of the product of the dielectric constant of said hollow conductor and the dielectric constant of said disk.

10. The arrangement as claimed in claim 1, further comprising:
a transition element, wherein:
said feedthrough and said window have a rectangular cross section;
said antenna has a circular cross section; and
said transition element, which transitions the rectangular cross section to the round cross section, is inserted between said feedthrough and said antenna.

11. The arrangement as claimed in claim 10, wherein:
said diameter of the circular cross section is slightly greater than the longer side of the rectangular cross section, so that the rectangular cross section completely fits in the circular cross section;
said transition element has a number of zones adjoining one another, of which a first outer zone has an axial, traversing bore, whose cross section equals the circular cross section of said antenna;
of which a second outer zone has an axial, traversing bore, whose cross section equals the rectangular cross section of said feedthrough; of which arranged between the first and the second outer zones are at least two transition zones, each of which has, penetrating the transition zone in an axial direction, a cavity, which is composed of a bore with a rectangular cross section and a coaxial supplemental bore with a circular cross section; and
the diameters of the supplemental bores are smaller than the diameter of the circular cross section of the first outer zone and greater than the shorter side of the rectangular cross section of the second outer zone, and proceeding from the transition zone adjoining the first zone, the diameter of the supplemental bores decreases from transition zone to transition zone.

12. The arrangement as claimed in claim 1, wherein:
the hollow conductor propagation capable, signal mode is a fundamental mode.

13. A feedthrough for microwave signals, comprising:
a hollow conductor; and
a microwave transparent window installed gas tightly in said hollow conductor, wherein said window includes:
a disk, whose thickness corresponds approximately to a half wavelength or a small integer multiple of the half wavelength of the first, hollow conductor propagation capable, signal mode of the microwave signals at a predetermined signal frequency in said disk; and
two matching layers located on opposite lying, outer surfaces of said disk, whose thickness corresponds to a fourth of the wavelength of the first, hollow conductor propagation capable, signal mode of the microwave signals at the predetermined signal frequency; and
said window is a one piece component comprising a signal material; and
said matching layers are layers of such material provided on the two oppositely lying, outer surfaces of said disk and equipped with cavities; and
the dimensions of the cavities are selected in such a manner that the matching layers each have an effective dielectric constant dependent on these dimensions, such that the effective dielectric constant corresponds to the square root of the product of the dielectric constant of the hollow conductor and the dielectric constant of the disk.

14. The feedthrough as claimed in claim 13, wherein:
the dimensions of the cavities are ascertained using computer simulations.

* * * * *